United States Patent [19]

Clarke

[11] Patent Number: 5,422,715
[45] Date of Patent: Jun. 6, 1995

[54] HYBRID ORTHOGONAL LOCALIZATION AND ORIENTATION SYSTEM

[76] Inventor: Thomas L. Clarke, 846 Keystone Cir., Oviedo, Fla. 32765

[21] Appl. No.: 29,538

[22] Filed: Mar. 11, 1993

[51] Int. Cl.6 .................................................. G01C 3/00
[52] U.S. Cl. ................................ 356/141.3; 356/375
[58] Field of Search ............... 356/375, 139.03, 141.1, 356/141.3, 141.4, 141.5, 373; 250/206.2, 206.3

[56] References Cited

U.S. PATENT DOCUMENTS

| | | | |
|---|---|---|---|
| 3,846,026 | 11/1974 | Waters | 356/152 |
| 3,983,474 | 9/1976 | Kuipers | 324/43 R |
| 4,017,858 | 4/1977 | Kuipers | 343/100 R |
| 4,677,555 | 6/1987 | Goyet | 364/424 |
| 4,700,301 | 10/1987 | Dyke | 364/424 |
| 5,100,229 | 3/1992 | Lundberg et al. | 356/1 |
| 5,294,970 | 3/1994 | Dornbusch et al. | 356/152 |

*Primary Examiner*—Robert Limanek
*Assistant Examiner*—David B. Hardy

[57] ABSTRACT

An improved device for determining the three-dimensional location and orientation of a subject in a virtual reality simulation is a hybrid of an optical localization system and independent tilt and direction sensors. Three or more modulated sources of light or near-infrared radiation are placed at the perimeter of the sensing volume; these sources are typically emitters surrounded by rotating cylindrical grating. A single photosensor extracts enough information from the radiation field to derive position within the volume. Orientation is sensed by small gravitational tilt and magnetic compass direction sensors. Since the sensing is entirely passive, any number of objects can be tracked within the volume as long as at least three of the sources are visible from the position of each object.

12 Claims, 1 Drawing Sheet

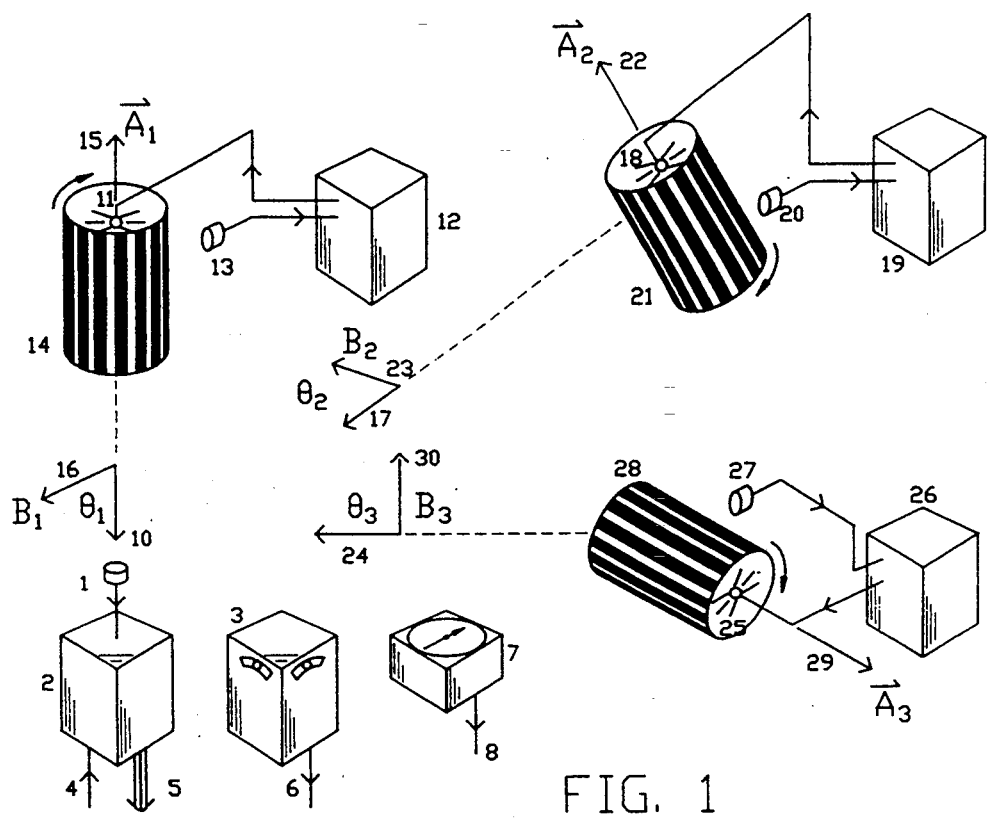
FIG. 1
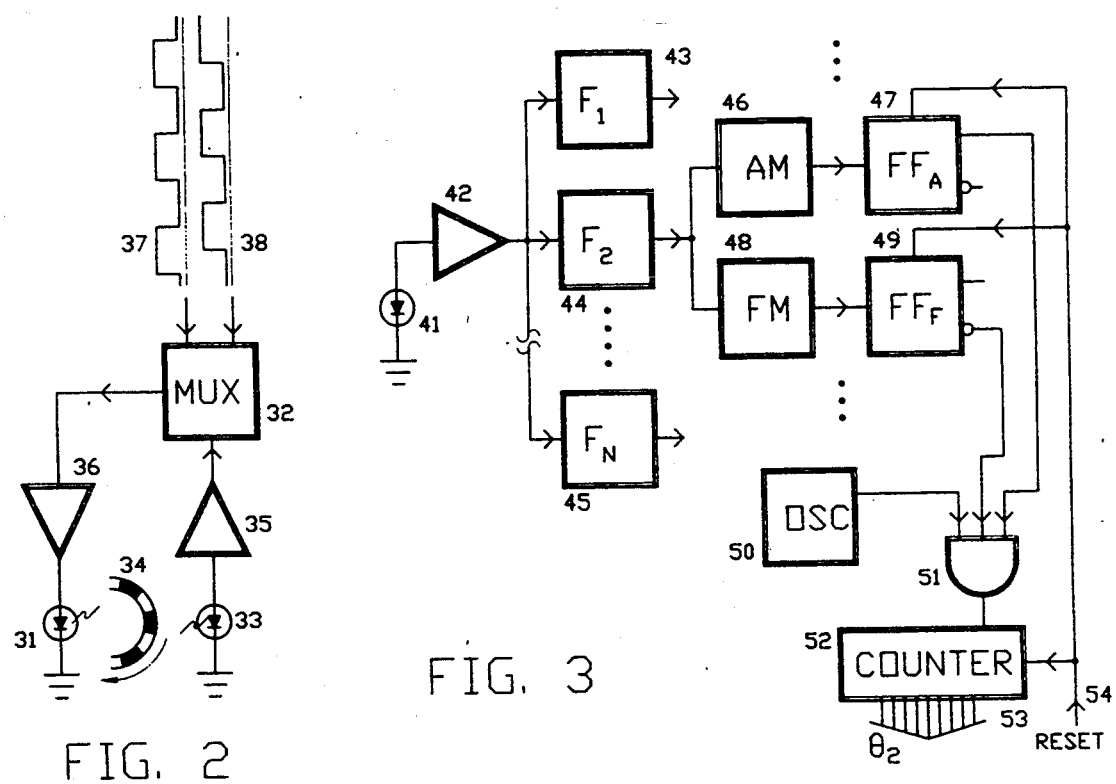
FIG. 2
FIG. 3

HYBRID ORTHOGONAL LOCALIZATION AND ORIENTATION SYSTEM

TECHNICAL FIELD

This invention is in the field of devices for remotely determining three dimensional location and orientation of an object.

While its primary application is in the field of tracking head position for computerized virtual reality presentations, this invention could be used to track other objects such as parts of machines, earth moving equipment, and so on.

BACKGROUND OF THE INVENTION

Within the field of virtual reality two technologies are commonly used. The first determines location and orientation by measuring the strength and phase of the electromagnetic signals induced in a set of receiver coils by a set of transmitter coils. U.S. Pat. Nos. 3,983,474. Sep. 28, 1976 and 4,017,858. Apr. 12, 1977, both by Jack Kuipers teach this art. This technique works only over a very limited range and is subject to interference from metal objects near the sensing volume. It is also difficult to operate more than one electromagnetic localizer system in the same vicinity without interference.

The second method uses the time of transmission of pulses of ultrasonic sound between sets of transmitters and sets of receivers to determine position and orientation. However, the fast response times needed for virtual reality can be obtained only over a short range because of the relatively slow speed of sound. It is also difficult to avoid interference between nearby localization systems and also interference caused by acoustic reflections from hard surfaces. There is little recent patent literature on this technique since it depends on art developed for SONAR and other applications during the last half-century.

Another approach to localization not often used for virtual reality uses light to provide the position and orientation information. This is the approach used in this invention. Several patents deal with optical localization techniques superficially similar to those used in the current invention. These include U.S. Pat. No. 3,846,026. Nov. 5, 1974, by Kenneth H. Waters./Continental Oil Company. In this patent a *Rotating Beam Surveying Method and Apparatus* is described which measures location via time coded angular variation of a narrow beam of light or other radiation. This is a good approach, but Waters' implementation would be too slow for virtual reality use since a measurement can only be obtained once per revolution of the beam and the practical revolution speed is limited by mechanical considerations.

A similar invention is described in U.S. Pat. No. 4,677,555. Jun. 30, 1987 by Noel Goyet. His *Method and Equipment for Automatic Guidance of Earthmoving Machines and Especially Machines for Laying Drainage Elements* uses a rotating laser beam to guide earth moving machinery. This invention is basically a variation of Waters' patent. U.S. Pat. No. 4,700,301. Oct. 13, 1987 by Howard L. Dyke, *Method of Automatically Steering Agricultural Type Vehicles*, is another invention that uses rotating light beams to position vehicles.

Much closer in spirit to this invention, but still lacking the essential elements of dual modulation of the light sources at unique frequencies and of using independent sensors for orientation, is U.S. Pat. No. 5,100,229. Mar. 31, 1992. by Eric Lundberg, Yvan Beliveau, and Timothy Pratt. Their *Spatial Positioning System* combines a rotating, pulsed laser together with an omnidirectional strobe in a mode similar to an aircraft VOR (VHF, Omnidirectional Ranging) to implement a system for surveying. The important element in their invention is the use of light to transmit both directional information via the rotating beam and timing information via the strobe. This eliminates awkward interconnecting cables required in the previously mentioned inventions, but is still subject to slow response time determined by the beam rotation speed.

Another technology within the prior art is the aircraft VOR navigation system mentioned above. While using radio waves instead of light or near-infrared radiation, the VOR nevertheless uses a combination of a rotating beam and a stationary beam to locate an aircraft relative to the glide path. There is little recent patent literature relevant to VOR navigation, since as with acoustics, this technology has been in use for years.

SUMMARY OF THE INVENTION

The object of this invention is to localize an object within a volume equivalent to a large room with a resolution and repeatability of 1 millimeter, an absolute accuracy of 1 centimeter and a response time of 30 milliseconds or less. At the same time the orientation of the object should be determined with a resolution and repeatability of 1 arc minute and an absolute accuracy of 10 arc minutes. These specifications are chosen to match the characteristics of the human sensory system which is sensitive to small fast changes, or jitter, but can easily compensate for larger absolute errors provided they are consistent. In order to cover a large room, the maximum distance that can be accommodated between stationary optical or near-infrared radiation sources and the receiver which attached to the object will be 10 meters.

This hybrid orthogonal localization and orientation system invention is able to accommodate multiple senses objects with little interference. The sensing elements mounted on the objects can be made small and lightweight.

To accomplish these goals, this invention uses a rotating periodic amplitude modulated pattern of light or near-infrared radiation rather than a discrete rotating beam. This pattern is most easily generated by rotating a cylindrical grating with alternate clear and opaque axially parallel bars around the source of radiation. Since the cylinder's grating pattern can have a multitude of bars, the frequency with which the pattern sweeps is much higher than the rotation rate of the cylinder. Frequencies of several thousand Hertz can be easily obtained; this high frequency ensures a fast response.

Position information is obtained by measuring the phase of the periodic amplitude variation seen by a small optical or near-infrared sensor mounted on the object. As the object moves, the absolute phase of the signal varies. To provide an absolute reference for the phase measurement, the radiation source is modulated at a much higher frequency, typically in the hundreds of kilohertz to megahertz range. This high frequency carrier is frequency modulated (FM) by a signal locked to the rotation of the radiation pattern. This signal is typically generated by a photosensor located adjacent to the rotating cylinder. A receiving system demodulates this FM carrier to provide the needed absolute reference. It is convenient to recover the phase of the periodic amplitude variation pattern from the incidental amplitude modulation (AM) of the same carrier; this helps reject optical noise sources such as ambient light and pulsing fluorescent illumination. Alternatively, the radiation sources may be modulated with an additional carrier whose purpose is to make detection of the AM modulation independent of the frequency modulated carrier.

Many rotating radiation sources can be used without interference by providing each with a different modulating frequency. Only a single photo-sensor need be used on the object since the various AM and FM signals can be separated in the receiving system. While a minimum of three rotating sources with linearly independent rotation axes is needed to determine the three spatial coordinates of the photosensor mounted on the object, it may be advantageous to use more to avoid problems with signal dropouts due to source obstruction.

The orientation function is independent of the localization function. Deriving orientation from localization would require multiple photosensors separated by a substantial distance to ensure accuracy. In addition to this awkward configuration, it is likely that an orientation measurement obtained this way would be excessively noisy. Instead, orientation will be obtained through a hybrid approach combining a tilt sensor measurement relative to gravitational vertical with a magnetic compass direction relative to magnetic north. The tilt sensor could be an electrolytic or capacitative tilt sensor, or even a pendulum. The magnetic compass can be a flux-gate or a Hall effect unit.

The invention thus takes the form of a number of modulated radiation sources near the perimeter of the sensing volume. These sources can be implemented as light or near-infrared emitters surrounded by rotating cylindrical gratings. A single photosensor obtains enough information from the radiation field to derive position of an object within the volume. Orientation is sensed by small tilt and magnetic compass sensors. Since all sensing is entirely passive, any number of objects can be tracked within the volume as long as at least three of the sources are visible from the position of each object.

The advantages of this invention are:
1. the large sensing volume made possible by the 10 meter or more range between the radiation sources and the photosensors,
2. the rapid response made possible by the high frequency at which the rotating radiation field varies,
3. the large number of objects that can operate simultaneously within the same volume made possible by the independence of the optical or near-infrared sensing process,
4. lack of jitter in the orientation measurement made possible by the hybrid approach which decouples the orientation measurement from the localization measurement, and
5. the small size of the sensors made possible by the use of FM coding of absolute phase using multiple independent high-frequency carries.

BRIEF DESCRIPTION OF THE DRAWINGS

FIG. 1 is a perspective, diagrammatic view of the major components of the present invention.

FIG. 2 is a block diagram of the modulator portion of the apparatus shown in FIG. 1.

FIG. 3 is a block diagram of the receiver portion of the apparatus shown in FIG. 1.

DETAILED DESCRIPTION OF THE INVENTION

Referring to FIG. 1, the preferred embodiment of this invention determines the location in three spatial dimensions of the photosensor 1. This is accomplished by demodulating in receiver 2 the modulated emissions from light or near-infrared emitters 11, 18, and 25. These radiation emissions are modulated in amplitude by rotating cylindrical gratings 14, 21, and 28. These emissions are additionally modulated with a frequency modulated signal by modulators 12, 19, and 26. These frequency modulated signals are synchronized to the rotation of the cylindrical gratings by reference photodetectors 13, 20, 27. Each emitter is modulated at a unique frequency.

By suitable signal processing, the receiver 2 determines the angles of rotation, $\theta_1$, $\theta_2$, $\theta_3$, of the light paths 10, 17, and 24 around the rotational axes, $\vec{A}_1$ 15, $\vec{A}_2$ 22, and $\vec{A}_3$ 29 with respect to the reference vectors $\vec{B}_1$ 16, $\vec{B}_2$ 23, and $\vec{B}_3$ 30. These angles are made available to the host system via a data interface 5, under control of control signals 4.

The orientation of the photosensor is determined by the signals 6 from tilt sensor 3 and signals 8 from a magnetic compass 7.

The block diagram of the preferred embodiment of the modulators 12, 19, and 26 is shown in FIG. 2. The radiation emitter 31 is driven by buffer 36 with either of two phase quadrature high frequency carrier signals 37 and 38 as selected by multiplexer 32. The signal selected is determined by how much radiation from the emitter 31 passes through the cylindrical grating 34 to strike the reference photosensor 33. The amplifier 35 amplifies the output of the photosensor to a suitable voltage level to operate the multiplexer 32.

The radiation emitted by the emitter will thus have a high frequency signal component whose phase shifts back and forth 90° in synchrony with the rotation of the cylindrical gratings 14, 21 or 28. This phase shift constitutes an instantaneous frequency modulation which does not affect the average radiation output of the emitter. Other types of modulation can be used instead of the frequency modulation or equivalent phase modulation. The modulation must, however, be detectable independently from the amplitude modulation induced by the rotating grating 34. As noted in the summary section, additional signals may be applied to the emitter 31 to facilitate detection of the amplitude modulation.

The preferred embodiment of the receiver 2 is shown in block diagram form in FIG. 3. The output from the photosensor 41 contains a superposition of the outputs from all the emitters 11, 18, and 25. This output is amplified by preamplifier 42 and filtered by the bank of filters $F_1$, 42, $F_2$, 44, . . . , and $F_N$, 45. This block diagram allows the possibility of $N \geq 3$ separate radiation sources. These filters are chosen to pass only the modulated signal from the corresponding emitter. $F_1$ transmits the signal from emitter 11, $F_2$ transmits the signal from emitter 22, $F_3$ that from emitter 25, and so on.

The output of each filter is applied to an AM detector 46, and an FM detector 48. While only the detectors for $F_2$ are shown for the sake of clarity, each filter has an associated detector, flip-flops, gate and counter. The output of the FM detector will then closely follow the output of the reference photosensor 33, associated with the corresponding cylindrical grating. The output of the AM detector also varies at the same frequency, but with phase determined by the angular position, $\theta_2$, of the photosensor.

This phase difference is measured by measuring the time delay between the toggling of an AM flip-flop, $FF_A$ 47, and an FM flip-flop, $FF_F$ 49. The output of $FF_A$ and the inverted output of $FF_F$ are ANDed in gate 51 with a high frequency oscillator OSC 50. The gated oscillator is counted by counter 52 provided as an estimate of the angle $\theta_2$ in binary form 53.

In operation when RESET signal 54 is removed, the AM signal toggles $FF_A$, so that counter 52 counts oscillator 50 until the FM signal toggles $FF_F$, stopping the count. Further transitions of the AM or FM waveforms have no effect until RESET is applied and removed. Thus, the host system to which the count of $\theta_2$ 53, is supplied has ample time to process the data.

The functional components can be realized in many ways, and the following discussion of types of components is illustrative and is not meant to restrict the scope of this invention. The photosensor 1 needs to respond to the high frequency modulation of the radiation emitters; this goal is best met with the current state-of-the-art by the use of a photodiode rather than a phototransistor. A phototransistor should be suitable for the reference photo detectors 13, 20, and 27 since these need only respond at a small multiple of the rotation rate of the cylindrical grating. The light or near-infrared radiation emitters must likewise be capable of rapid changes in output and the best current technology for this is the light-emitting-diode.

The rotating gratings my be rotated by any convenient means that provide a nearly constant rotation speed. AC induction motors were used in a prototype. The gratings may be fabricated by mounting the cylinder wrapped in masking tape in a lathe. The lathe head is rotated or indexed while a knife mounted on the slide is used to scribe the tape parallel to the axis of the cylinder. Alternate strips of tape are then peeled away, and the cylinder was spray painted black. Removal of the tape then produces the cylindrical grating with alternating transparent and opaque axially-parallel stripes.

Standard integrated logic circuits such as TTL or CMOS are suitable for the multiplexer, 32, the and gate 51, the counter 52, the flip-flops 47 and 49, and the oscillator 50. The amplifiers 35 and buffer 36 are interface integrated circuits chosen to match the logic family chosen.

The preamplifier 42 will be a suitable low-noise integrated circuit; suitable types of parts are those used in radio frequency circuitry. Similarly the filters 43, 44 and 45 can be implemented using tuned transformers as is standard practice in radio frequency circuitry.

The AM detector 46 can make use of integrated circuits designed for broadcast radio reception. The audio outputs of these circuits are often a good match to logic voltage levels. The FM detector is most conveniently implemented using a phase-locked-loop integrated circuit. These circuits also commonly have logic level outputs. The result is that the detected output of the photosensor is three or more pairs of signals recovered from the AM and FM carrier frequencies associated with each beam. As the detector moves around in space, the phase of the AM signals will vary with respect to the reference provided by the FM signals in accordance with the angle between the photosensor and the radiation source.

The tilt sensor 3 and compass 7 can utilize any of a variety of technologies. An electrolytic tilt sensor consisting of a tube partially filled with a conductive liquid and multiple electrodes is suitable for 3. As the system tilts, the fluid level on the electrodes changes producing a measurable change in resistance. Another possibility is a mechanical pendulum coupled to potentiometers. A magnetic direction measurement can be provided by a flux-gate magnetic sensor or by Hall effect sensors. While a gyro compass might be able to combine both tilt and direction measurements, a gyro compass would probably be too large for use in the intended virtual reality application.

The ultimate limit of the accuracy of this positioning method is determined by the spreading of the intensity pattern optical diffraction. For reasonable wavelengths or radiation, if the period of the cylindrical grating is s, the radiation emitter has a Fresnel distance of $2\pi S^2/\lambda$ which for s=1 mm and a wavelength $\lambda$ of 700 nm (infrared), is about 10 meters. This rotating radiation beam, angular triangulation system is fully capable of meeting the 1 mm accuracy requirement.

Operating frequencies must be chosen properly if adequate accuracy in localization is to be achieved. The radiation beams are modulated by a carder signal with a frequency that varies in synchrony with the radiation intensity variation caused by the rotation of the cylindrical grating. Each radiation source is assigned a different carrier frequency so the signals from each source can be easily separated in the signal processor via frequency filtering. Since the carrier frequencies are FM modulated at a frequency of at most a few thousand Hertz, a carrier separation of a few hundred KHz is adequate to allow many sources to be used in the same sensing volume.

To ensure that latency is not a problem, the FM modulating frequency which is set by the rotation speed of the cylindrical grating multiplied by the number of slits must be higher than the reciprocal of the desired response time. For a 3600 rpm rotation (60 Hz), a multiplier of 16 slits gives a 960 Hz modulation frequency for the FM and incidental AM so new angle estimates are available within a millisecond. The oscillator 50 should have a frequency of at least $2\pi R_{max}(S/60)/\Delta x$ where $R_{max}$ is the maximum range, $\Delta x$ is the desired spatial resolution, and S is the rotation speed of the grating in RPM. For 10 meter range, 1 mm accuracy and 3600 RPM, this minimum frequency is only 3.76 MHz so that only modest performance is required of the counter 52 and gate 51.

The number of slits in the cylindrical grating does not factor into the frequency of oscillator 50; while a larger number of slits increases the fundamental AM frequency, on the other hand, it decreases the size of the region of space that corresponds to a full count of counter 53. The use of multiple slits in the grating also introduces an ambiguity into the angular measurements since identical counts can be obtained at multiple locations corresponding to rotation by the angular period of the grating. This should not be a problem in virtual reality applications since it is unlikely that the subject will cross multiple grating boundaries between sample intervals.

The rotating radiation beam approach taken here depends on maintaining a high enough signal to noise ratio (SNR) for the rotating beams to be reliably detected under all circumstances. For optical and near-infrared operation, the most difficult condition is probably operation in direct sunlight. Direct sunlight corresponds to an radiation intensity of $I_0=1000$ watts/m$^2$ with a close to uniform spectrum in the optical and near-infrared. Since available solid-state infrared and visible sources emit over a narrow range of wavelengths, a narrow band filter can be used to remove much of the ambient sunlight. A filter spectral bandwidth of $B_{SW}=10$ nm (nanometers) is easily obtainable, so considering the spectral width of sunlight to be $B_{SW0}=10^3$ nm, the amount of ambient light reaching the photosensor can be reduced by a factor of 100.

Additionally, the emitted light is modulated so that the receivers can be designed to filter out only the relevant modulation. A generous estimate for the signal bandwidth is $B_{FW}=10^4$ Hz. This is compared to the equivalent signal bandwidth of sunlight, $$B_{FW0}=c/B_{SW0}=3\times 10^8/10^{-6} \sim 3\times 10^{14} \text{Hz}.$$

The signal power intensity is given by $I=P_0/4\pi R_{max}^2$, where $P_0$ is the emitted optical radiation power. If $P_0$ is an eye-safe 10 mw (milliwatts), at 10 meters I equals $10^{-5}$ w/m$^2$. Thus, the ratio of signal to sunlight in the desired signal bandwidth is $$S_{NRsun}=B_{FW0}\cdot B_{SW0}I/B_{FW}B_{SW}I_0=3\times 10^4 >> 1.$$

Thus, interference from sunlight will not be a problem. Care must be taken, of course, to operate the photosensor in a linear mode so they are not saturated when placed in sunlight. If the photosensor becomes saturated, then low level signals can be lost.

Photon noise can also be a problem. Radiation comes in quanta of size hf, where h is Planck's constant and f is frequency; for light or near-infrared, hf is about 1 electron volt, or $1.6\times 10^{-19}$ joules. To avoid photon noise, the number of photons received per second must be large. This is calculated by $n=P/hz=I\cdot A_D/1.6\times 10^{-19} \sim 6\times 10^8$ photons/second, where AD is the detector area ($10^{-6}$ m$^2$ for a 1 millimeter detector). Since $$SNR_{phot}=n/B_{FW}=6\times 10^4 >> 1,$$

photon noise will not be a problem.

Thermal noise can also be a problem. The noise power is given by $P_N=4\times 10^{-21}\cdot B_{FW} \sim 4\times 10^{-17}$ w. Inserting the value for the signal power used above gives
$$SNR_{therm}=P/P_N=10^{-11}/4\times 10^{-17} \sim 2.5\times 10^5 >> 1.$$

The radiation signals in the proposed system are thus well above the noise level under all conditions.

The host system to which the hybrid localizer is attached must take the angular outputs $\theta_1$, $\theta_2$, $\theta_3$ and calculate the three spatial coordinates $\vec{X}=(x_1\ x_2\ x_3)$ of the photosensor. This can be done via standard linear algebra techniques. Defining a coordinate system for the jth radiation source in terms of the axial vector $\vec{A_j}=(a_{j1}\ a_{j2}\ a_{j3})$, the reference vector $\vec{B_j}=(b_{j1}\ b_{j2}\ b_{j3})$, and a third orthogonal vector $\vec{C_j}=(c_{j1}\ c_{j2}\ c_{j3})$, the transformation from the emitter coordinates to spatial coordinates is $$\vec{X}=T\vec{E_j}+\vec{P_j}=[A_j\ B_j\ C_j]^{-1}\vec{E_j}+\vec{P_j}$$

where $\vec{P_j}=(p_{j1}\ p_{j2}\ p_{j3})$ is the spatial position of the jth light emitter.

The measurement of $\theta_j$, constrains the photosensor to lie within the plane spanned by the vectors $\vec{A_j}$ and $\cos\theta_j\vec{B_j}+\sin\theta_j\vec{C_j}$. A convenient way to express this fact is $(\vec{X}-\vec{P_j})\cdot\vec{N_j}=0$, where $N_j=\sin\theta_j\vec{B_j}-\cos\theta_j\vec{C_j}$ is the normal to this plane. The problem of calculating the position thus reduces to solving the relatively simple set of linear equations $$(\vec{X}-\vec{P_j})\cdot\vec{N_j}=0, j=1\ldots N,$$

which is non-singular provided the axial vectors $\vec{A_j}$ are linearly independent. The minimum value for N is of course the three emitters needed to determine the three spatial coordinates. These equations, however, easily handle any value of N by using a least squares or pseudo-inverse technique whenever N>3. Using larger values of N has the advantage of avoiding difficulties whenever one of the radiation emitters is accidentally obscured.

I claim:

1. A system for measuring spatial location comprising a radiant energy sensor, three or more radiant energy emitters, means imposing a rotating intensity pattern on said emitters, means modulating said emitters with a modulated signal unique to each emitter and phase-locked to the intensity rotation pattern of each emitter, signal processing means extracting amplitude modulation of said unique signals from the output of said optical sensor and extracting said modulated signals from said optical sensor, and means measuring a phase shift between said extracted amplitude modulation and said extracted modulated signal.

2. A system for measuring spatial location as specified in claim 1 with additional means measuring orientation with respect to a local gravitational vertical and means measuring direction with respect to the earth's magnetic field.

3. A system for measuring spatial location as specified in claim 1 with an electrolytic sensor measuring tilt, and a flux gate compass determining direction with respect to the earth's magnetic field.

4. A system for measuring spatial location as specified in claim 1 with an electrolytic sensor measuring tilt, and Hall-effect sensors determining direction with respect to the earth's magnetic field.

5. A system for measuring spatial location comprising a radiant energy sensor, three or more radiant energy emitters, a rotating cylindrical grating surrounding each emitter, reference radiant energy detectors adjacent to each cylindrical grating, means for generating a periodic signal of unique frequency energizing each emitter, electronic circuitry varying a phase of said periodic signal in response to said corresponding radiant energy detector, amplification and filtering separating the unique periodic signal associated with each emitter from said radiant energy sensor output, means detecting an amplitude modulation of each filtered signal, means detecting a phase modulation of each filtered signal, and means measuring a phase shift between an intensity modulation and said phase modulation detected from each filtered signal.

6. A system for measuring spatial location as specified in claim 5 with additional means measuring orientation with respect to a local gravitational vertical and means measuring direction with respect to the earth's magnetic field.

7. A system for measuring spatial location as specified in claim 5 with an electrolytic sensor measuring tilt, and a flux gate compass determining direction with respect to the earth's magnetic field.

8. A system for measuring spatial location as specified in claim 5 with an electrolytic sensor measuring tilt, and Hall-effect sensors determining direction with respect to the earth's magnetic field.

9. A system for measuring spatial location comprising a photosensor, three or more light-emitting-diodes, a rotating cylindrical grating surrounding each light-emitting-diode, reference photodetectors adjacent to each cylindrical grating, means for generating a periodic signal with unique frequency energizing each light-emitting-diode, electronic circuitry varying a phase of said periodic signal in response to said corresponding reference photodetector, amplification and filtering means separating the unique periodic signal associated with each light-emitting-diode from said photosensor output, means detecting an amplitude modulation of each filtered signal, means detecting a phase modulation of each filtered signal, and means measuring a phase shift between a intensity modulation and said phase modulation detected from each filtered signal.

10. A system for measuring spatial location as specified in claim 9 with additional means measuring orientation with respect to a local gravitational vertical and means measuring direction with respect to the earth's magnetic field.

11. A system for measuring spatial location as specified in claim 9 with an electrolytic sensor measuring tilt, and a flux gate compass determining direction with respect to the earth's magnetic field.

12. A system for measuring spatial location as specified in claim 9 with an electrolytic sensor measuring tilt, and Hall-effect sensors determining direction with respect to the earth's magnetic field.

* * * * *